United States Patent Office 3,383,279
Patented May 14, 1968

3,383,279
METHOD OF TREATMENT COMPRISING ADMINISTRATION OF SORBITOL-FURFURAL CONDENSATION PRODUCT AND PHARMACEUTICAL COMPOSITION INCLUDING SAID CONDENSATION PRODUCT
Aldo Garzia, Lodi, Milan, Italy, assignor to Instituto Chemioterapico Italiana S.p.A., Milan, Italy, a corporation
No Drawing. Filed May 18, 1965, Ser. No. 456,836
9 Claims. (Cl. 167—55)

ABSTRACT OF THE DISCLOSURE

This invention is concerned with compositions of sorbitol-furfural condensation product and the use of such for treating hepatic disease and hepatic-intestinal malfunctions.

---

The present invention relates to a product and method for treating hepatic diseases and hepatic-intestinal malfunctions in vertebrates.

The liver secretes bile which is discharged into the intestine, absorbs from the blood the products of carbohydrate digestion and stores them as glycogen, acts on nitrogenous wastes and returns them to the blood in the form of urea and related compounds, and destroys worn-out red corpuscles. Other important functions include detoxication and the production of fibrinogen and prothrombin.

In accordance with the present invention, hepatic diseases and hepatic-intestinal malfunctions in vertebrates, e.g. human (man) and animal subjects, are treated with therapeutic amounts of sorbitol-furfural. The sorbitol-furfural is produced by the condensation of sorbitol and furfural according to known methods, for example, by subjecting the furfural and sorbitol to a condensation reaction in the presence of acid catalysts while removing or tying up the water split off during the condensation reaction. The condensation products include those prepared by condensing from about 1 to 3 mols of furfural for each mol of sorbitol. The preferred condensation product is one prepared by condensing furfural and sorbitol on a mol per mol basis, for instance, to produce the 2,4-acetal or sorbitol, e.g. 2,4-monofurfurylidenesorbitol having the chemical structure:

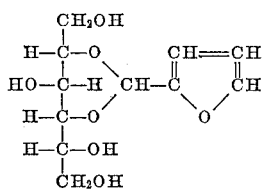

which is a non-toxic, flavorless product. For convenience, the sorbitol-furfural will hereinafter be referred to as "SF."

It has now been found that SF exhibits advantages including the following: it results in low toxicity in acute and chronic administration; promotes the glycogen deposition in the liver by replacing the stores and keeping them as much as possible at the highest and most constant level even when the damaged hepatocyte is unable to make use of glucose, thus preventing fatty degeneration; exerts a protective effect against hepatotoxic agents; increases the excretion of bile and biliary salts; reduces blood cholesterol; and relieves constipation and gastrointestinal discomfort.

The present invention includes a composition containing SF as the active ingredient in admixture with an inert, non-toxic, pharmaceutically-acceptable diluent or carrier. The compositions may take the form of tablets, powders, capsules, or other dosage forms which are particularly useful for oral ingestion.

The compositions may also take the form of the SF mixed with a solid diluent or tableting adjuvant such as cornstarch, lactose, talc, stearic acid, magnesium stearate, gums, or the like. Any of the tableting materials usually used in pharmaceutical manufacturing may be employed as long as there is no incompatibility with the SF. The particular material used may be tableted without the use of adjuvants if so desired.

The SF, with or without adjuvants, is preferably placed in a capsule or resorptive material such as a gelatin capsule and administered in that form.

Oral administration, particularly for humans is preferred, advantageously in the form of capsules or tablets, especially gelatinous tablets. The dosage of SF may vary depending upon the subject treated whether animal or human and the body weight of the subject. The dosage is generally one sufficient to alleviate the undesirable effects of hepatic disorders, for instance, sufficient to improve the chromoexcretive capacity of the liver cells damaged by hepatoxic agents. Ordinarily the dosage will fall in the range of about 1 to 600 milligrams per day per kilogram of body weight of the subject. Generally the unit dosage for oral administration to man is from about 0.01 to 10 grams per day, advantageously in unit dosage of from about 0.5 to 4 grams.

The following examples illustrate the present invention. The designation "SF" as used hereinafter designates 2,4-monofurfurylidenesorbitol.

EXAMPLE I

Carbon tetrachloride administration induces centrilobular necrosis of the liver associated with loss of diphosphopyridine nucleotide, hepatic glycogen, coenzime A and increase in neutral fat. A suitable means for evaluating the degree of damage induced by $CCl_4$ or the degree of protection afforded by drugs is to study the biliary excretion of bromophenolsulphonphthalein (BSP).

One reliable index of liver functions is one evaluating the chromoexcretive capacity of hepatocytes. Such an index is provided by the bromophenolsulphonphthalein (BSP) test. According to these tests, the choledocus of an animal, for instance, is cannulated and a solution of bromophenolsulphonphthalein is injected into the caudal vein. The bile is then collected for 1 hour and the bromophenolsulphonphthalein excreted determined colormetrically. The degree of abnormal excretion of bromophenolsulphonphthalein is correlated to the damage of the liver cells. Also, the chromoexcretive capacity of hepatocytes has been found to be similar to the bilirubino-metabolic power of the liver.

Experiments were carried out in adult female Sprague-Dawley rats by administering, intraperitoneally as a 20 percent concentrate in a peanut oil solution, 1 ml./kg. $CCl_4$ for 4 days (1st group), $CCl_4$ added with 200 mg./kg. of SF (2nd group), $CCl_4$ added with 400 mg./kg. of SF (3rd group), or $CCl_4$ added with 200 mg./kg. of methionine (4th group). 24 hours after the last injection, the animals were anesthetized, the choledocus was cannulated and 0.4 ml./kg. of a 1 percent solution of BSP was injected into a caudal vein. The bile was collected during a 60-minute period and the BSP excreted was determined colormetrically. The results obtained, summarized in Table I, show that SF provides protective activity comparable to that provided by methionine, a drug widely used in liver therapy.

TABLE I

| Treatment | BSP excreted, γ/hr./ 100 gr. of body weight ±S.D. |
|---|---|
| Saline | [1] 335±29 (25) |
| $CCl_4$ | 123±36 (20) |
| $CCl_4$ and SF, 200 mg./kg. i.p | [2] 209±41 (20) |
| $CCl_4$ and SF, 400 mg./kg. i.p | [3] 271±38 (20) |
| $CCl_4$ and methionine, 200 mg./kg. i.p | [3] 216±29 (20) |

[1] Figures in parentheses represent the number of animals tested.
[2] $P > 0.05$ in comparison with the animals treated with $CCl_4$ alone (statistically significant).
[3] $P > 0.01$ in comparison with the animals treated with $CCl_4$ alone (statistically significant).

EXAMPLE II

Pyridine is able to induce a rapid lipid infiltration of the liver (fatty degeneration of the liver) when administered orally to subjects. This fatty degeneration of the liver is suitable for studying the protective effect exerted by drugs.

Groups of female Sprague-Dawley rats were submitted over a period of 20 days to a normal diet (1st group), to the normal diet plus 1% pyridine (2nd group), to the normal diet plus 1% pyridine and 0.75% SF (3rd group), or to the normal diet plus 1% pyridine and 0.75% methionine (4th group). At the end of the period the percentage of surviving animals, the percentage of body weight variation, the total liver lipids, and the serum lipids were determined. The results obtained, reported in Table II, demonstrate that SF exerts a protective effect on fatty infiltration of the liver caused by pyridine more pronounced, for instance, than that exerted by methionine which is presently in use for liver therapy.

EXAMPLE III

Glycogen is a reserve material in the liver readily available for the needs of the hepatic cell metabolism. The content of glycogen in the liver is a very useful index for evaluating liver conditions, for instance, a well-known hepatotoxic agent, $CCl_4$, depletes the hepatic stores of glycogen. A drug-induced increase of glycogen in the liver is meaningful for liver protective activity.

Experiments on adult female Sprague-Dawley rats were performed to elucidate whether, or to what extent, SF exerts such activity. The experimental conditions and the results obtained are summarized in Table III.

TABLE III

| Compounds administered: mg./kg. and route of administration | | Length of treatment in days | Hepatic glycogen, g./100/g.[1] of liver ±S.D. |
|---|---|---|---|
| Saline | i.p. | 12 | 0.176 0.015 (50) |
| SF | 200 i.p. | 4 | [2] 0.230 0.042 (30) |
| SF | 400 i.p. | 4 | [2] 0.290 0.019 (30) |
| SF | 400 i,p. | 12 | [3] 0.315 0.038 (20) |
| SF | 500 p.o. | 4 | [2] 0.221 0.023 (30) |
| SF | 500 p.o. | 12 | [3] 0.329 0.035 (20) |
| Sorbitol | 400 i.p. | 4 | 0.186 0.019 (30) |
| Sorbitol | 500 p.o. | 4 | 0.195 0.021 (20) |
| Methionine | 200 i.p. | 4 | 0.183 0.027 (20) |
| Methionine | 500 p.o. | 4 | 0.188 0.049 (20) |

[1] Figures in parentheses represent the number of animals treated.
[2] $P < 0.05$, statistically significant.
[3] $P < 0.01$, statistically significant.
i.p.=Intraperitoneal.
p.o.=Per os.

The results show the marked increase of the hepatic glycogen observed after SF administration in comparison with the lack of this effect after administration of methionine and sorbitol, the latter being chemically similar to SF.

EXAMPLE IV

The effect of SF on choleresis was investigated. An increase in the biliary outflow can be considered as a sign of a stimulation of the hepatic cell activity, in particular when accompanied by an increase in the biliary salt excretion. If this effect is achieved by a drug with a clear liver protective activity, it can be interpreted as a consequence of ameliorated metabolism of the hepatic cells.

Experiments were performed on adult female Sprague-Dawley rats. SF was administered orally in some cases, and intravenously in others. Treatments with sodium dehydrochlorate, a known choleretic agent, are included for comparison. A treatment with saline is also included as a control. Determination of the outflow of bile and biliary salts was made by the usual technique of placing the rat under barbiturate anesthesia and cannulating the rat's choledocus. The experiments and results are reported in Table IV below.

TABLE II.—EFFECT OF SF ON HEPATIC DAMAGE INDUCED BY PYRIDINE

| Treatment | Percent of Surviving Animals | Precent of Body Weight Variation | Total liver Lipids, mg./g. ±S.D. | Serum lipids (total), mg. Percent ±S.D. |
|---|---|---|---|---|
| Normal diet | 100 | +33.5 | 43.9±0.7 | 149±4.9 |
| Pyridine (1%) | 40 | +12.8 | 74.5±1.3 | 196±12.3 |
| Pyridine (1%) plus SF (0.75%) | 80 | [1] +24.9 | [1] 52.9±1.1 | [2] 163±9.6 |
| Pyridine (1%) plus methionine (0.75%) | 60 | +16.3 | 66.5±1.4 | 156±11.3 |

[1] $P < 0.01$ in comparison with the animals treated with pyridine alone (statistically significant).
[2] $P < 0.05$ in comparison with the animals treated with pyridine alone (statistically significant).

TABLE IV.—EFFECT OF SF ON CHOLERESIS

| Treatment | % Variation of the Bile Outflow [1] | | | % Variation of the Biliary Salt Excretion [2] | | |
|---|---|---|---|---|---|---|
| | 1st hour | 2d hour | 3d hour | 1st hour | 2d hour | 3d hour |
| | After Drug Administration | | | | | |
| Saline, cc. 5 kg., i.v. (25) | −1.5±0.4 | −3.9±0.3 | −2.8±0.6 | −8.7±0.9 | −18.7±1.4 | −16.6±1.3 |
| SF, 300 mg./kg., i.v. (15) | +21.2±0.7 | +7.4±0.5 | +1.3±0.4 | +17.8±1.4 | −0.7±0.4 | −8.5±0.8 |
| SF, 450 mg./kg., i.v. (15) | +65.6±1.9 | +30.2±1.3 | +18.2±0.6 | +39.1±2.4 | −5.1±0.9 | −6.8±1.3 |
| SF, 600 mg./kg., p.o. (20) | +39.2±1.6 | +18.5±0.9 | +12.8±0.7 | +21.8±1.8 | +3.8±0.8 | −5.3±0.7 |
| Na dehydrocholate, 100 mg./kg., iv. (10) | +86.5±4.1 | +35.2±1.7 | +16.3±0.9 | −23.5±1.7 | −26.3±2.1 | −29.6±1.9 |
| Na dehydrocholate, 400 mg./kg., p.o. (10) | +52.3±3.7 | +23.2±1.9 | +4.8±0.7 | −10.2±0.9 | −18.7±1.5 | −21.2±2.1 |

[1] Figures in parentheses represent the number of animals tested.
[2] The values have been calculated in comparison with those observed during the two hours preceding drug administration.

The data of Table IV demonstrate that SF administration, both orally and intravenously, increases the outflow of bile and biliary salts while the known choleretic agent, sodium dehydrochlorate, increases only the bile flow.

EXAMPLE V

An investigation was conducted to determine the effect of SF on blood cholesterol. The effect was studied after a single administration as well as after a prolonged administration of SF to adult female Sprague-Dawley rats to elucidate the action of SF on lipid biosynthesis. The results are shown in Table V below:

TABLE V

| Treatment | Blood cholesterol, mg. percent ±S.D. | No. of Animals |
|---|---|---|
| Controls | 96.3±14.1 | 50 |
| SF 400 mg./kg., i.p. after 1 hour | 85.4±13.6 | 15 |
| SF 400 mg./kg., i.p. after 3 hours | 97.3±12.4 | 15 |
| SF 400 mg./kg., i.p. after 6 hours | 87.1±13.6 | 15 |
| SF 200 mg./kg., i.p. for 12 days | 65.2±9.7 | 15 |
| SF 400 mg./kg., i.p. for 12 days | 53.4±13.1 | 25 |
| SF 400 mg./kg., p.o. for 12 days | 79.6±9.6 | 25 |

The results summarized in Table V show a reduction in blood cholesterol when using SF intraperitoneally or per os and quite significantly after prolonged intraperitoneal treatment.

The acute toxicity of SF has been evaluated in rats, mice and rabbits. When applied intraperitoneally to rats, SF has an $LD_{50}$ of 2425 mg./kg. (confidence limits: 2135–2948) and in mice, the $LD_{50}$ after intraperitoneal administration is 2615 mg./kg. (confidence limits: 2256–2972). When administered orally to the three animal species studied (mice, rats, and rabbits), the $LD_{50}$ is more than 3 g./kg.

The chronic toxicity of SF has been studied in rats by administering 600 mg./kg. and 200 mg./kg. of SF per os. for 2 and 4 months, respectively. The results, summarized in Table VI, show no pathological changes. The increase of hepatic glycogen is due to the specific pharmacodynamic action of the compound. The chronic toxicity of SF was also studied in mice and rabbits and similar results were obtained.

TABLE VI.—CHRONIC TOXICITY OF SF IN THE RATS

| | SF, 200 mg./kg. for 4 months | | SF, 600 mg./kg. for 2 months | |
|---|---|---|---|---|
| | Controls | Treated | Controls | Treated |
| Body weight (g.) at— | | | | |
| The beginning | 91±3.6 | 95±6.9 | 93±2.9 | 94±3.6 |
| The end | 249±8.2 | 229±9.3 | 151±6.3 | 142±3.9 |
| Percent Morality | 3.6 | 9.1 | 1.5 | 4.2 |
| Red blood cells, millions/mm.³ | 6.12±0.31 | 6.28±0.46 | 6.21±0.31 | 6.36±0.39 |
| White blood cells, thousand/mm.³ | 7.12±0.56 | 6.98±0.61 | 7.02±0.36 | 6.84±0.58 |
| Blood sugar, mg. percent | 96.3±8.9 | 105.2±6.4 | 94.6±3.9 | 106.2±7.2 |
| Serum protein, g. percent | 6.8±0.4 | 7.6±0.8 | 7.7±0.8 | 7.9±0.5 |
| Blood cholesterol, mg. percent | 87.8±7.4 | 73.2±4.5 | 103.5±7.3 | 89.3±5.9 |
| Hepatic glycogen, mg. percent | 172±18 | 279±31 | 170±3.9 | 322±64 |
| Liver lipids, mg./g | 41.4±2.3 | 46.2±3.1 | 43.6±1.2 | 49.6±3.1 |
| Biliary BSP excretion γ/100g./h | 356±29 | 341±32 | 305±21 | 358±36 |
| Food consumption (during the last week of treatment g./100 g.) | 8.7±3.5 | 9.2±4.6 | 9.7±2.6 | 10.3±4.2 |

EXAMPLE VI

Gelatinous tablets containing 1 g. of SF in each are orally administered at a rate of 2 tablets per day to a man for therapeutical purposes for treatment of hepatic disease and hepatic-intestinal malfunctions.

EXAMPLE VII

Gelatinous tablets containing 1 g. of SF and 2 g. of sorbitol each are orally administered at a rate of 4 tablets per day to a man for therapeutical purposes for treatment of hepatic disease and hepatic-intestinal malfunction.

The results of clinical investigations which demonstrated the therapeutic value of SF in treating hepatic diseases and hepatic-intestinal malfunctions are summarized infra.

The investigations were conducted with patients of different age who were suffering from various liver ailments. The SF was prepared for administration to the patients as a gelatinous tablet. The investigation revealed that SF in dosages of 2 to 4 grams per day are preferable and also that SF in combination with sorbitol in a ratio of at least 1 part by weight of SF for each part by weight of sorbitol, for instance, a SF to sorbitol ratio of about 1 to about 1 to 2, enhanced the therapeutical properties of SF.

A. Liver function tests

SF was administered to 25 patients suffering from various liver ailments for periods ranging between 7 and 30 days to evaluate the effect of SF on liver function as determined by the BSP test. The procedure used in this test was the usual one and was carried out on unicteric patients. The patients were subjected to the BSP test before and after the treatment period. All the patients exhibited an abnormally high BSP retention prior to treatment. The results of the investigations are shown in Table VII below:

TABLE VII

| Patient No. | | BSP Percent Retention Before Treatment | Treatment SF, 2–4 g./day, days | BSP Percent Retention After Treatment |
|---|---|---|---|---|
| 1 | Subacute hepatitis | 27 | 20 | 11 |
| 2 | Chronic hepatitis | 30 | 15 | 26 |
| 3 | do | 28 | 15 | 30 |
| 4 | do | 37 | 30 | 27 |
| 5 | do | 40 | 24 | 36 |
| 6 | Post-hepatic cirrhosis | 21 | 15 | 22 |
| 7 | Cirrhosis | 44 | 30 | 40 |
| 8 | do | 18 | 21 | 14 |
| 9 | do | 34 | 30 | 32 |
| 10 | do | 29 | 20 | 30 |
| 11 | Subacute hepatitis | 16 | 20 | 12 |
| 12 | Fatty cirrhosis | 31 | 20 | 21 |
| 13 | do | 20 | 30 | 8 |
| 14 | do | 18 | 15 | 4 |
| 15 | do | 14 | 20 | 5 |
| 16 | do | 22 | 15 | 7 |
| 17 | do | 20 | 15 | 10 |
| 18 | Cirrhosis | 31 | 20 | 36 |
| 19 | Subacute hepatitis | 20 | 15 | 18 |
| 20 | do | 26 | 15 | 10 |
| 21 | Post-cholangitic hepatitis | 14 | 15 | 3 |
| 22 | Cholelithiasis | 16 | 12 | 7 |
| 23 | do | 14 | 21 | 15 |
| 24 | Fatty cirrhosis | 19 | 20 | 8 |
| 25 | do | 11 | 20 | 4 |

The data clearly confirm the pharmacological results as well as the therapeutic activity of SF.

The changes in serum lability reactions were found to be less important and steady.

The blood prothrombin level is used as an index of hepatic functions. The blood prothrombin level (Quick's time) in 15 cases exhibiting a decreased Quick's time was increased by the SF treatment in 7 cases.

B. Peroral cholecystography

Radiograms were carried out at 15, 30, 45, 60 and 120′ intervals after SF administration. Bronner's test was effected previously in the same subjects with a normal cholecystokinetic response. The changes in cholecyst volume and morphology were very little, therefore it could be concluded that SF exerts an insignificant cholecystokinetic action.

C. Cholesterolemia

Various changes (but always insignificant) were observed in the levels of total blood cholesterol in patients with chronic liver disorders (an increase in some, a decrease in others). In normal patients no considerable changes were noted. In 11 patients affected with hypercholesterolemia the treatment with SF resulted in a 12% average decrease in total cholesterol with a maximum value of 22%.

D. Tolerability

The drug was always quite well tolerated also by patients suffering either from cholecystopaties or cholelithiasis. At the beginning of the treatment some diarrhoeic discharge was observed in some cases of chronic cholitis. The trouble was found to be temporary and in any case disappeared by reducing the dosage.

E. Other results

A constant and progressive regression of dispetic symptomatology of patients affected with liver diseases was observed, which resulted in a rise in appetite, a regularization of alvine function and an improvement in general conditions. For instance:

(1) Twenty-four patients suffering from constipation due to liver malfunction were treated with SF; sixteen of them showed a normalization in the number of discharges and in the macroscopic nature of the stool after 3 to 6 days of treatment;

(2) The meteorism and the post-prandium sensation of repletion either decreased or disappeared in most cases treated; and (3) A moderate increase in body weight was observed in one third of the cases at the end of the therapeutical cycle.

The intestinal transit time of an opaque meal with and without SF was studied in 20 patients. The results obtained show that SF exerts a clear accelerating effect on transit time particularly in the small intestine. For instance, a striking effect was observed in 8 cases, a rather clear one in 3, a moderate one in 7, and no effect at all in 2 cases. In the former cases the opaque meal had reached the ascending caecum one hour after its administration. The transit through the large intestine does not seem to occur at the same rate, but it is always fast. A clear summary of the results was obtained by a comparison of various radiological aspects. The response, although of different intensity, was positive in 80% of the cases studied. The results were shown to be much more evident in male patients.

Studies on biliary flow through duodenum catheterization (Varela Loper and Varela Fluentes) were carried out after both single and protracted SF administration for at least 7 weeks. A significant increase in biliary flow was not observed in any patient under examination after a single administration of SF. However, a moderate increase in biliary flow was observed in 3 of the 8 patients subjected to prolonged treatment with SF.

The following example is offered to illustrate the preparation of 2,4-monofurfurylidenesorbitol.

EXAMPLE VIII

To a stirred mixture of 1000 milliliters of aqueous sorbitol (910 grams dry substance) and 10 milliliters of concentrated hydrochloric acid were added 400 milliliters of furfural. After addition of the furfural stirring was continued for 3 hours during which period the temperature of the medium was maintained at approximately 25° C. The medium was then allowed to stand for 15 hours at approximately 25° C. To the medium were then added 3000 milliliters of an aqueous solution of sodium bicarbonate (14 grams dry substance). The medium was then heated to about 90° C. and 30 grams of activated carbon were added thereto. The medium was then filtered, the temperature of the medium being maintained at approximately 90° C. during the filtration. The medium was then allowed to cool to room temperature during which cooling period a precipitate of 2,4-monofurfurylidenesorbitol was formed. The precipitated 2,4-monofurfurylidenesorbitol was then separated from the medium by filtration and the filtered medium was cooled to about 5° C. During the cooling period additional 2,4-monofurfurylidenesorbitol was precipitated. The second precipitate of 2,4-monofurfurylidenesorbitol was separated from the aqueous medium by filtration. The aqueous medium was then concentrated under vacuum to precipitate additional 2,4-monofurfurylidenesorbitol.

It is claimed:

1. A method of treating hepatic and hepatic-intestinal malfunctions in vertebrates which comprises administering to said vertebrates therapeutic amounts of a composition consisting essentially of an acetal of sorbitol prepared by the condensation of from about 1 to 3 mols of furfural for each mol of sorbitol.

2. A method of treating hepatic and hepatic-intestinal malfunctions in man which comprises administering to man therapeutic amounts of 2,4-monofurfurylidenesorbitol.

3. The method of claim 2 wherein these amounts range from about 1 to 600 milligrams per day per kilogram of body weight.

4. The method of claim 2 where these amounts are from about 2 to 4 grams per day per man and the administration is per os.

5. A method of improving the chromoexcretive capacity of the liver of animal and human beings impaired with respect to said capacity which comprises administering to said beings about 1 to 600 milligrams per kilogram of body weight per day of 2,4-monofurfurylidenesorbitol.

6. The method of claim 5 wherein the being is man and the 2,4-monofurfurylidenesorbitol is administered per os in an amount of from about 2 to 4 grams per day.

7. A pharmaceutical composition which is in a form for oral use, said composition including, as the active ingredient, an acetal of sorbitol prepared by the condensation of from about 1 to 3 mols of furfural for each mol of sorbitol, the acetal in admixture with an inert, non-toxic, phramaceutically-acceptable solid diluent, said composition containing in unit dosage form between about 0.1 to 10 grams of active ingredient.

8. The composition of claim 7 wherein the acetal is 2,4-monofurfurylidenesorbitol.

9. The composition of claim 8 in the form of a gelatinous capsule or tablet wherein the unit dosage is 0.5 to 4 grams.

References Cited

UNITED STATES PATENTS 2,853,495  9/1958  Ruskin _____ 260—340.7

ALBERT T. MEYERS, *Primary Examiner.*

SAM ROSEN, *Examiner.*

S. J. SINGER, S. FRIEDMAN, *Assistant Examiners.*